United States Patent
Serban et al.

(10) Patent No.: US 10,386,937 B2
(45) Date of Patent: Aug. 20, 2019

(54) FOREIGN OBJECT DETECTION SYSTEMS AND CONTROL LOGIC FOR VEHICLE COMPARTMENT CLOSURE ASSEMBLIES

(71) Applicant: GM GLOBAL TECHNOLOGY OPERATIONS LLC, Detroit, MI (US)

(72) Inventors: Doru N. Serban, Richmond Hill (CA); Princess Len Carlos, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 242 days.

(21) Appl. No.: 15/589,224

(22) Filed: May 8, 2017

(65) Prior Publication Data
US 2018/0321758 A1   Nov. 8, 2018

(51) Int. Cl.
| | | |
|---|---|---|
| *G06F 3/03* | (2006.01) |
| *B60J 5/04* | (2006.01) |
| *B61D 19/02* | (2006.01) |
| *E06B 7/36* | (2006.01) |
| *E05F 15/40* | (2015.01) |
| *G02B 27/00* | (2006.01) |
| *G06F 3/01* | (2006.01) |
| *E05F 15/43* | (2015.01) |

(52) U.S. Cl.
CPC ............ *G06F 3/0325* (2013.01); *B60J 5/047* (2013.01); *B61D 19/026* (2013.01); *E05F 15/40* (2015.01); *E06B 7/36* (2013.01); *G02B 27/0012* (2013.01); *G06F 3/017* (2013.01); *B60K 2350/1052* (2013.01); *B60K 2350/2013* (2013.01); *E05F 2015/434* (2015.01); *E05Y 2400/54* (2013.01); *E05Y 2400/852* (2013.01); *E05Y 2900/50* (2013.01); *E05Y 2900/544* (2013.01)

(58) Field of Classification Search
CPC ........ G06F 3/0325; G06F 3/017; E05F 15/40; E06B 7/36; B61D 19/026; B60J 5/047; G02B 27/0012; B60K 2350/1052; B60K 2350/2013
See application file for complete search history.

(56) References Cited

U.S. PATENT DOCUMENTS

| | | | |
|---|---|---|---|
| 5,263,762 A | 11/1993 | Long et al. | |
| 5,350,986 A * | 9/1994 | Long et al. | E05F 15/41 318/432 |

(Continued)

*Primary Examiner* — Dale W Hilgendorf
(74) *Attorney, Agent, or Firm* — Quinn IP Law (57) ABSTRACT

Disclosed are object detection systems for automated compartment closure assemblies, methods for operating such systems, and motor vehicles with a power liftgate assembly and foreign object detection capabilities. A method is disclosed for detecting objects obstructing the path of an automated closure assembly. The method includes receiving a command signal to move the closure assembly to an open or closed position, and receiving gesture-sensitive sensor signals with a location and velocity of an object within a supervision field. Responsive to the object being inside a protected zone within the supervision field or the object's velocity being towards the protected zone, commanding an automated driving mechanism to: slow the closure assembly's speed; if the object is still located inside the protected zone after a calibrated period of time, stop the closure assembly; and if the object moves outside the protected zone, increase the closure assembly speed to a default speed.

20 Claims, 2 Drawing Sheets

(56) References Cited

U.S. PATENT DOCUMENTS

| | | | |
|---|---|---|---|
| 5,955,854 | A | 9/1999 | Zhang et al. |
| 6,173,233 | B1 | 1/2001 | Janutka et al. |
| 6,208,102 | B1* | 3/2001 | Kikuchi et al. ......... E05F 15/40 |
| | | | 318/466 |
| 6,615,121 | B2 | 9/2003 | Li |
| 6,814,394 | B2* | 11/2004 | Yogo et al. ................ B60J 5/06 |
| | | | 49/360 |
| 7,761,209 | B2 | 7/2010 | Morris et al. |
| 7,782,001 | B2* | 8/2010 | Herwig et al. ............ B60J 5/06 |
| | | | 49/26 |
| 8,280,593 | B2 | 10/2012 | Nakakura et al. |
| 8,766,162 | B2* | 7/2014 | Tanase .................... G06F 3/017 |
| | | | 250/214 AL |
| 8,938,337 | B2 | 1/2015 | Nakakura et al. |
| 9,174,517 | B2 | 11/2015 | Scheuring et al. |
| 9,447,612 | B2 | 9/2016 | Oakley et al. |
| 9,573,446 | B2 | 2/2017 | Scheuring et al. |
| 2003/0222758 | A1 | 12/2003 | Willats et al. |
| 2007/0266635 | A1* | 11/2007 | Sugiura et al. ......... E05F 15/42 |
| | | | 49/27 |
| 2009/0260289 | A1 | 10/2009 | Carpenter et al. |
| 2010/0076651 | A1 | 3/2010 | Nakakura et al. |
| 2010/0228448 | A1 | 9/2010 | Nakakura et al. |
| 2011/0313619 | A1* | 12/2011 | Washeleski et al. ... E05F 15/40 |
| | | | 701/36 |
| 2012/0324791 | A1 | 12/2012 | Parsadayan et al. |
| 2014/0150581 | A1 | 6/2014 | Scheuring et al. |
| 2018/0142510 | A1* | 5/2018 | Ikeda et al. ............. E05F 15/40 |
| 2018/0187472 | A1* | 7/2018 | Ikeda et al. ............. E05F 15/40 |

* cited by examiner

FOREIGN OBJECT DETECTION SYSTEMS AND CONTROL LOGIC FOR VEHICLE COMPARTMENT CLOSURE ASSEMBLIES

INTRODUCTION

The present disclosure relates generally to compartment closure assemblies for motor vehicles, such as the trunk lid, liftgate, tailgate, side doors, engine hood, and collapsible roof. More specifically, aspects of this disclosure relate to foreign object detection systems and control algorithms for automated vehicle closure assemblies.

Many current production motor vehicles, such as the modern-day automobile, are originally equipped with compartment closure assemblies that are movably mounted to the vehicle body to provide access to the vehicle's various compartments. Driver-side and passenger-side vehicle doors, for example, can be opened and closed to allow user access for entering and exiting the passenger compartment. In contrast, the engine hood (or "bonnet" in some countries) extends over and covers the vehicle's engine compartment to prevent theft or damage of the engine components. A traditional trunk compartment, on the other hand, is a large storage bin located at the rear of the vehicle and covered by a trunk lid that is hinged underneath the passenger compartment's rear deck. By comparison, pickup trucks and other cargo transport vehicles (e.g., sport utility vehicles (SUV), cargo vans, box trucks, etc.) may be typified by a rear cargo compartment that is closed off at the tail end by a hinged liftgate, tailgate, or door assembly. Some automobiles—more commonly known as "convertibles"—are equipped with a collapsible roof, while some offer as optional equipment a sunroof panel in the vehicle roof, both of which can be opened for extra sunlight and ventilation for the passenger compartment.

Automated compartment closure assemblies, such as the power liftgates and power side doors available on many modern SUV's and minivans, automatically open and close through operation of pneumatic, hydraulic, or motor-driven mechanisms. During operation of an automated compartment closure assembly, a foreign object may unexpectedly enter or otherwise obstruct the opening or closing path of the compartment closure assembly. To obviate the likelihood of damage to the vehicle and the object, most power-actuated compartment closure assemblies include protectionary mechanisms, oftentimes in the form of an "anti-pinch" switch, that operate to reverse or stop the motion of the closure assembly upon contact with the foreign object. While these features may serve to prevent severe damage to the vehicle and object, the amount of contact typically required to activate the protectionary mechanism may still result in minor damage to the compartment closure assembly or the object. As an additional security measure, some vehicles will employ a proximity sensor to detect the presence of objects obstructing the path of the compartment closure assembly and responsively disable the closure assembly's automated driving system.

SUMMARY

Disclosed herein are foreign object detection systems for automated compartment closure assemblies, methods for making and methods for using such systems, and motor vehicles with a power liftgate assembly and foreign object detection capabilities to regulate operation of the power liftgate. By way of example, and not limitation, there is presented a novel infrared (IR) sensing based architecture that compliments and improves the functionality of a counterbalanced power liftgate (PLG) system while addressing perceived customer confidence levels towards foreign object detection protection. This foreign object detection (FOD) system (sometimes referred to herein as a "Secondary Object Detection" system or "SOD") is operable to detect the presence of obstructions in the path of an opening and closing compartment closure assembly and react by stopping and/or reversing the closure assembly to a full open position. In addition, the IR-based FOD system is operable to identify a foreign object as it approaches or enters a predetermined proximity of the closure assembly and automatically reacts by slowing down the closure movement. In so doing, the obstruction condition may self-rectify or be avoided altogether; if not, system reaction time is significantly extended and the dynamics of the liftgate reduced accordingly.

Attendant benefits for at least some of the disclosed concepts include improved FOD system reliability, reduced false-positive reversals where the obstruction is self-rectifying, and minimized warranty claims and overall system costs. An attendant benefit, for example, may include better system robustness where, even if a gesture-recognition sensor does not activate the FOD system's preventive features in response to an obstruction, a proximity sensor or anti-pinch switch is provided with extended time to register and react to a detection. Dual-layer functionality also helps to optimize vehicle ergonomics by preventing the power closure assembly from returning to a full-open position in response to a momentary obstruction. These features, in turn, help to improve customer confidence levels towards automated compartment closure assemblies and attendant FOD protection.

Aspects of the present disclosure are directed to control algorithms for detecting foreign objects proximate a power-driven closure assembly, and attendant logic for regulating operation of the closure assembly to avoid inadvertent contact with a detected object. Disclosed, for example, is a method for detecting objects obstructing an automated closure assembly, which is power-driven via an automated driving mechanism to move between closed and open positions to respectively cover and uncover an opening to a vehicle compartment. The method includes, in any order and in any combination with any of the disclosed features: determining whether the closure assembly is closed or open; receiving, e.g., via a vehicle controller from a user input device or another networked controller, an input command signal to move the closure assembly from the open (or closed) position to the closed (or open) position; receiving, via the vehicle controller from a gesture-sensitive sensor, signals indicative of the location and velocity of an object moving within a supervision field proximate the closure assembly; and, responsive to the object being located inside a protected zone within the supervision field or the object's velocity pointing towards the protected zone, commanding the automated driving mechanism to: slow the closure assembly's speed while moving along the path between open and closed positions; responsive to the object being located inside the protected zone after a calibrated period of time, stop the closure assembly; and, responsive to the object moving or remaining outside the protected zone, increase the closure assembly's speed to a default operating speed.

Other aspects of the present disclosure are directed to motor vehicles with a power closure assembly and foreign object detection capabilities to regulate operation of the power closure assembly. A "motor vehicle," as used herein, may include any relevant vehicle platform, such as passenger vehicles (internal combustion engine (ICE), hybrid, full electric, fuel cell, fully or partially autonomous, etc.), commercial vehicles, industrial vehicles, tracked vehicles, off-road and all-terrain vehicles (ATV), farm equipment, boats, airplanes, etc. In the same vein, a "closure assembly," as used herein, may include any relevant vehicle component, such as a power liftgate, a power tailgate, a power vehicle door (sliding or hinged), a power window, a power sunroof, or a power collapsible roof. A motor vehicle is disclosed that includes a vehicle body with an internal compartment, and a closure assembly movably mounted to the vehicle body to selectively transition between closed and open positions to respectively cover and uncover an access opening to the internal compartment. An automated driving mechanism is operable to automatically move the closure assembly from the closed to the open position, and back, in response to one or more electronic command signals. One or more gesture-sensitive sensors is/are operable to detect objects moving within a supervision field proximate the closure assembly and output signals indicative thereof The motor vehicle also includes a vehicle controller, such as a programmable liftgate electronic control unit (ECU), that communicates with the automated driving mechanism and the gesture-sensitive sensor. The vehicle controller is programmed to determine if the closure assembly is in the full-open position, and to receive an input command signal to move the closure assembly along a closing path from the open position to the closed position. Prior to, contemporaneous with, or after receiving the input command signal, the vehicle controller may receive signals from the gesture-sensitive sensor indicative of a location and a velocity of a detected object moving within the supervision field. Responsive to a determination that the object is located inside a protected zone within the supervision field or the object's velocity is directed towards the protected zone, the vehicle controller commands the automated driving mechanism to: slow the speed of the moving closure assembly; if the object location is inside the protected zone after a calibrated period of time, stop the closure assembly; and if the object location is no longer inside the protected zone, increase the speed of the closure assembly to a default speed toward the full-closed position.

Additional aspects of the present disclosure are directed to non-transitory, computer readable media storing instructions executable by at least one of one or more processors of one or more in-vehicle electronic control units. These instructions, when executed, cause the ECU(s) to perform various operations, which may include, in any order and in any combination with any features presented in this disclosure: determining if an automated closure assembly is in an open position (or a closed position); receiving an input command signal to move the closure assembly along a path to the closed (or open) position; receiving, from a gesture-sensitive sensor, signals indicative of a location and a velocity of an object moving within a supervision field proximate the closure assembly; and, responsive to a determination that the object location is inside a protected zone within the supervision field or the object velocity is towards the protected zone, commanding the automated driving mechanism to: slow a speed of the closure assembly while moving along the path; responsive to a determination that the object location is inside the protected zone after a calibrated period of time, stop the closure assembly; and responsive to a determination that the object location is no longer inside the protected zone, increase the speed of the closure assembly to a default speed.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Figure 1:
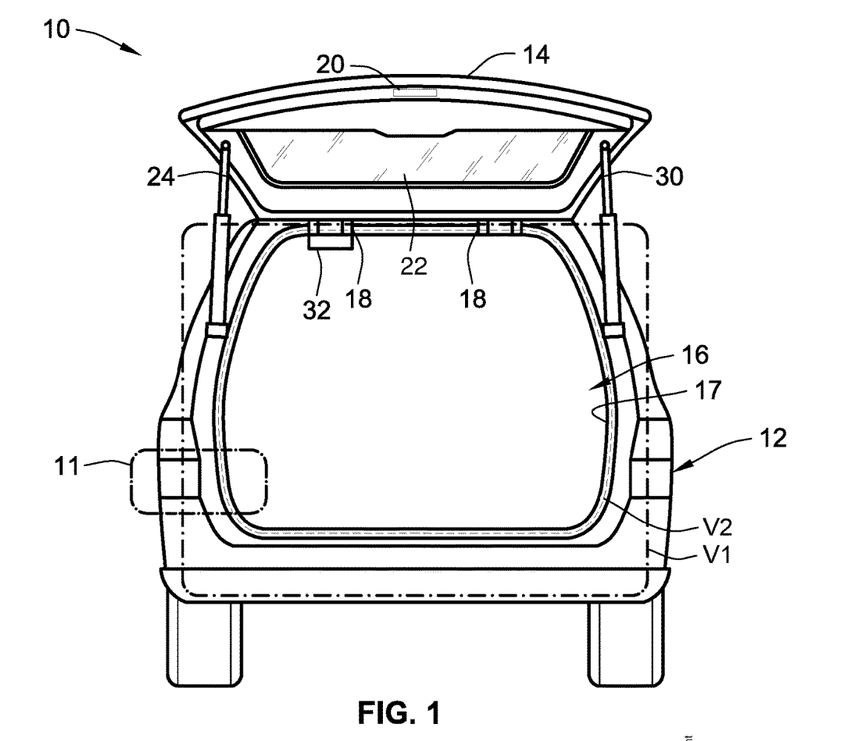
FIG. 1 is a rear-view illustration of a representative motor vehicle with a power liftgate and a foreign object detection (FOD) system with gesture-sensing and variable response capabilities in accordance with aspects of the present disclosure.

Referring now to the drawings, wherein like reference numbers refer to like features throughout the several views, there is shown in FIG. 1 an illustration of a representative automobile, which is designated generally at 10 and portrayed herein for purposes of discussion as an all-wheel-drive (AWD) sport utility vehicle (SUV). Mounted to a rear portion of the vehicle body 12 of automobile 10, e.g., aft of a passenger compartment and proximate a rear bumper structure, is a representative compartment closure assembly 14, which is represented herein as a power liftgate that provides access to a rear cargo compartment 16 of automobile 10. The illustrated automobile 10—also referred to herein as "motor vehicle" or "vehicle" for short—is merely an exemplary application with which many aspects and features of this disclosure may be practiced. In the same vein, implementation of the present concepts for a power liftgate assembly 14 should be appreciated as an exemplary application of the novel aspects and features disclosed herein. As such, it will be understood that aspects and features of the present disclosure may be applied to other compartment closure assemblies, and implemented for any logically relevant type of motor vehicle. Lastly, the drawings presented herein are not necessarily to scale and are provided purely for instructional purposes. Thus, the specific and relative dimensions shown in the drawings are not to be construed as limiting.

Closure assembly 14 (also referred to herein as "power liftgate" or simply "liftgate" for ease of reference) is movably mounted to the vehicle body 12 through a pair of laterally spaced hinges 18. These hinges 18 allow the closure assembly 14 to revolve about a pivot axis that extends transversely along an upper edge of a large opening 17, providing access to the rear cargo compartment 16. With this configuration, the representative liftgate 14 of FIG. 1 can be manually swung about its hinge axis between a closed position, whereat the liftgate 14 extends across and generally fluidly seals the opening 17, and an open position (as shown), whereat the liftgate 14 is displaced from and uncovers the opening 17 for free access to the cargo compartment 16. The power liftgate assembly 14 is also fabricated with a door latching mechanism 20 for securing the assembly 14 in the closed position. An optional electronic door lock (not shown) may be incorporated into the latching mechanism 20 to lock the liftgate 14 in the closed position. Further, the liftgate assembly 14 may be provided with a power window 22 that can also be opened and closed to provide limited access to or increased ventilation for the rear cargo compartment 16. While shown and described as a liftgate, it should be appreciated that the novel features of this disclosure can be applied to compartment closure assemblies of many different forms, such as a trunk lid, a tailgate, a rear cargo door, driver-side or passenger-side vehicle doors, an engine hood, a sunroof, a collapsible roof, and the like.

Figure 2:
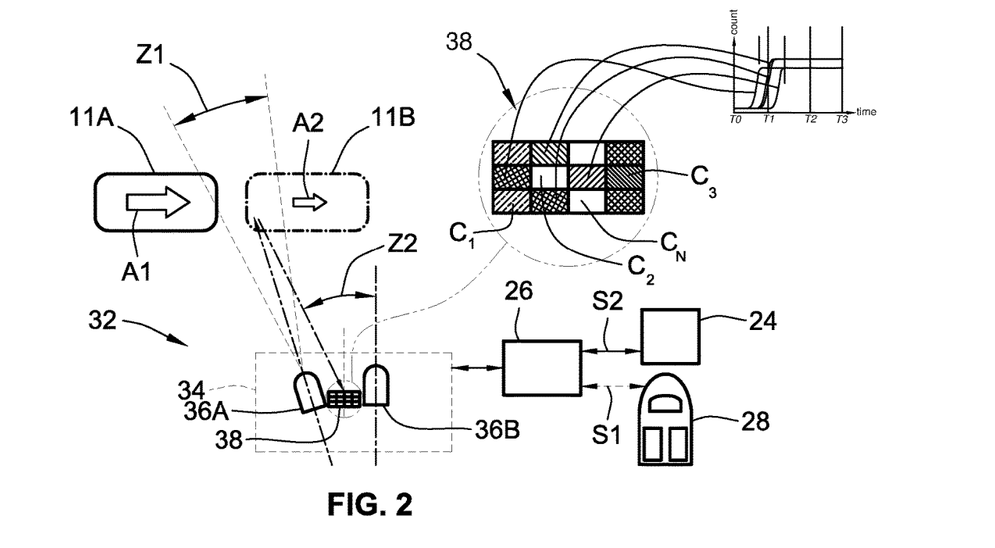
FIG. 2 is a schematic illustration of a representative FOD system for an automated compartment closure assembly in accordance with aspects of the present disclosure.

In addition to, or as an alternative for manually opening and closing the liftgate 14, the vehicle 10 may be equipped with an automated driving mechanism, which is represented herein by a motor-driven telescoping control arm 24 that is operated via a vehicle controller 26 (FIG. 2). Responsive to an input command signal S1 received, for example, from a user input device (e.g., a key fob 28) or another in-vehicle networked controller, the vehicle controller 26 sends a corresponding command signal S2 to the automated driving mechanism 24 to selectively transition the power liftgate 14 from the closed position to the open position, the open position to the closed position, and/or to situate the liftgate 14 at any position therebetween. While described as a motor-driven telescoping control arm, the automated driving mechanism 24 may take on other now known or hereinafter developed architectures, such as hydraulic, pneumatic, belt-driven, rack-and-pinion, ball-and-screw, and power-screw type drive systems.

According to the illustrated example, the automated driving mechanism 24 may be complemented by a counterbalance system, such as a pneumatic cylinder 30, to assist with opening the liftgate 14. Pneumatic cylinder 30 of FIG. 1 functions as a "gas spring" that stores potential energy generated by compressing the cylinder 30 when the liftgate 14 is closed, and releases the stored energy to bias and thereby raise the liftgate 14 when unlatched. By incorporating a counterbalance system into the power liftgate assembly 14, the motor-driven telescoping control arm 24 may be unidirectional (e.g., only function to selectively close the liftgate 14). In FIG. 1, the arrows originating at or extending to the vehicle controller 26 are emblematic of electronic signals or other communication exchanges by which data and/or control commands are transmitted from one component to the other.

To help prevent unwanted or otherwise inadvertent contact between the vehicle closure assembly 14 and an object (shown schematically at 11 in FIG. 1) that is obstructing the opening/closing path of the assembly 14, the vehicle 10 is equipped with a foreign object detection (FOD) system 32 and complementary control logic for regulating movement of the assembly 14. According to the illustrated architecture, FOD system 32 employs one or more non-contact gesture-sensitive sensors 34 (FIG. 2) mounted, for example, to an interior surface of a roof panel that defines an upper peripheral edge of the cargo compartment's 16 access opening 17. The FOD system 32 employs a pair of light emitting diode (LED) infrared (IR) emitters 36A and 36B, each of which is independently actuable to emit light energy in the infrared spectrum. An IR transceiver 38 with a matrix of Ambient Light Sensing (ALS) IR sensitive cells $C_1, C_2, C_3, \ldots C_N$ is operable for sending and receiving infrared data, such as detecting ambient light proximate the liftgate 14 and/or light generated by either LED IR emitter 36A, 36B and reflected off of object 11. Each non-contact gesture-sensitive sensor 34, while described herein as an infrared-enabled device, may be any appropriate sensing device, such as ultrasonic sonar, radar, laser, etc. Moreover, the sensor(s) 34 may be packaged at alternative locations throughout the vehicle 10, such as within a rear bumper, on a rear pillar flanking the opening 17, or any combination of positions. Vehicle controller 26 of FIG. 2 is communicatively connected with the FOD system 32 and programmed to stop, pause, slow, and/or reverse the automated driving mechanism 24 to prevent the compartment closure assembly 14 from contacting the object 11 when the FOD system 32 detects the object 11 interfering with or about to interfere with the path of the power liftgate 14, as will be described in extensive detail below.

By way of further clarification, and not limitation, the IR sensitive area of the sensor's 34 IR receiver portion 38 offers improved consistency through integration of a set of "reference" cells. During operation of the sensor 34, for example, each "batch" measurement includes of at least two measurements—a first measurement or series of measurements evaluating ambient conditions and a second measurement or series of measurements sampling actual IR light reflection. The relevant data may thereafter result from subtracting the second from the first. A typical measurement delay for the sensor 34 may be about 2.7 μs such that at least approximately 300,000 measurements per second (including processing time) can be achieved. As will be discussed in further detail below, the first LED IR emitter 36A may be employed to create a preventive zone Z1 while the second LED IR emitter 36A may be employed to create a protected zone Z2, with the two zones Z1 and Z2 cooperatively defining a "supervision field" monitored by the FOD system 32. Clearly, the shape, size and location of each zone can be modified from that which are shown in the drawings depending, for example, on the intended application of the system 32. As an obstacle 11 is approaching either zone Z1 or Z2, the cells $C_1, C_2, C_3, \ldots C_N$ are sensing a return response that is representative, e.g., of a position (e.g., reference coordinates within a Cartesian coordinate system) and a magnitude (e.g., direction of movement, speed, acceleration, deceleration, etc.) of the object 11 in the supervision field; controller 26 may perform a calculation with a geometrical processor. The controller 26 may be further operable to calculate a Phase Difference from a succession of measurements—for any single object within a "tracking" path, received signals are likely to be substantially identical to one another but different in time (i.e., a time lag). As defined by signal processing techniques, if a signal has the same shape but occurs at a different moment in time, that particular signal is related to another one taken as reference as having a Phase Difference.

Figure 3:
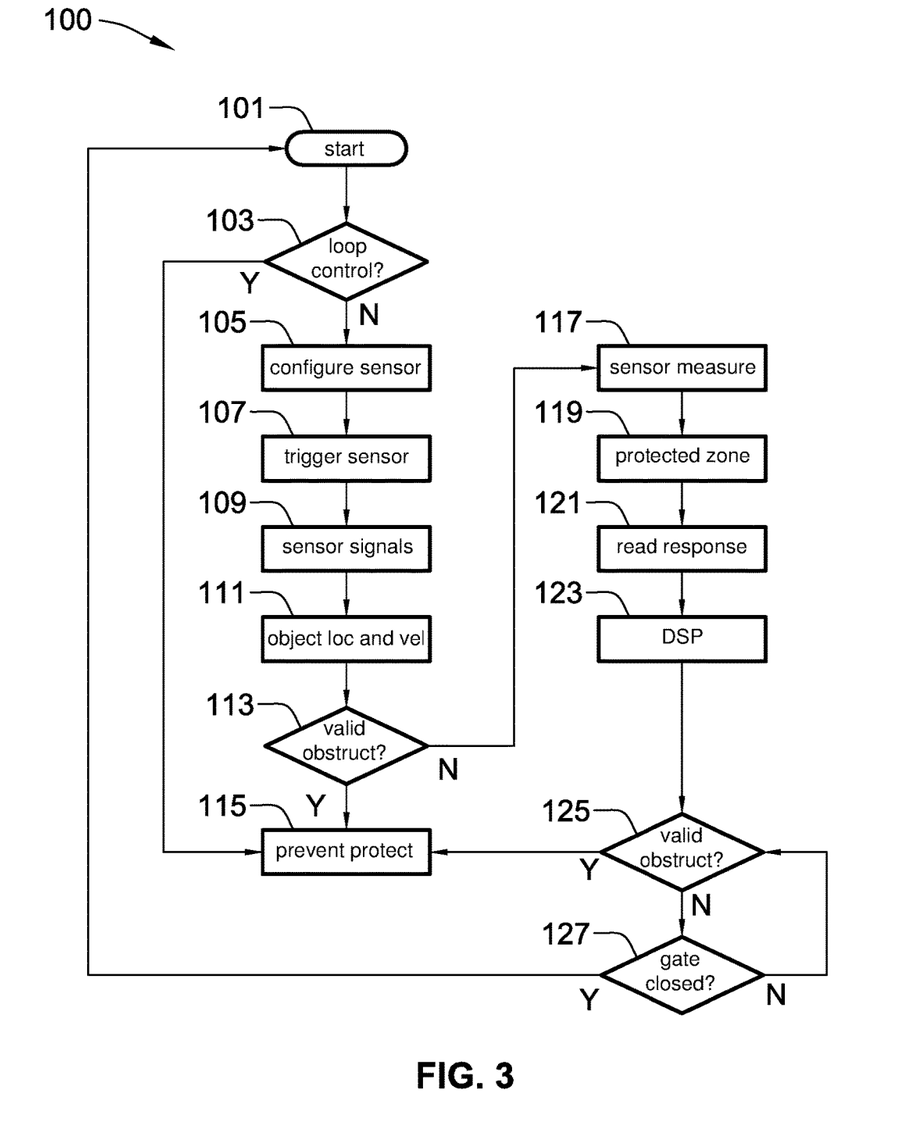
FIG. 3 is a flowchart for a representative FOD system control algorithm that may correspond to memory-stored instructions executed by onboard control-logic circuitry, programmable electronic control unit, or other computer-based device of a motor vehicle in accord with aspects of the disclosed concepts.

With reference now to the flow chart of FIG. 3, an improved method or control strategy for operating a foreign object detection system, such as FOD system 32 of FIG. 2, and active management of an automated compartment closure assembly, such as power liftgate 14 in FIG. 1, for example, is generally described at 100 in accordance with aspects of the present disclosure. Some or all of the operations illustrated in FIG. 3 and described in further detail below can be representative of an algorithm that corresponds to processor-executable instructions that can be stored, for example, in main or auxiliary or remote memory, and executed, for example, by an ECU, a central processing unit (CPU), an on-board or remote control logic circuit, or other device, to perform any or all of the above and/or below described functions associated with the disclosed concepts.

Method 100 of FIG. 3 starts at terminal block 101, which may include identifying the current status of the automated closure assembly. For instance, the vehicle controller 26 may assess the position of control arm 24 to determine whether the power liftgate 14 of FIG. 2 is in the full-closed position—extending across and restricting access to the rear cargo compartment—or the full-open position—displaced from and providing generally unrestricted access to the cargo compartment. The initialization of method 100 at terminal block 101 may also, or alternatively, be responsive to the vehicle controller 26 receiving an input command signal to move the closure assembly from the closed position to the open position, or from the open position to the closed position. It may be desirable, for at least some applications, to limit implementation of the method 100 to instances where the closure assembly is in an open position and an input command is received to move the closure assembly to a closed position. In a more specific instance, the illustrated method may be employed only during a closing operation of the liftgate and only when the liftgate is approaching the full-closed position.

At decision block 103, the vehicle controller 26 determines whether or not to execute a loop control subroutine to synchronize the timing sequence of all operations in the method 100. This control subcomponent helps to ensure that the illustrated tasks, as well as other tasks related to the operation of the power liftgate assembly 14, are performed in a synchronized manner such that the sequence of actions occurs accurately in time. If the loop control subroutine has already been triggered (Block 103=Y), method 100 of FIG. 3 may skip operations 105-113 and proceed directly to process block 115, e.g., to begin remediation procedures, such as sending a control command signal to automated driving mechanism 24 to the return the compartment closure assembly 14 to the full-open position. Conversely, if it is decided that the loop control subroutine has not already been triggered (Block 103=N), the method 100 triggers loop control and proceeds to process block 105. Optionally, the system 32 may run one or more calibrating trials to identify any system-calibrated constants implemented from memory that might be shifted out of value due to climate factors, for example, and correct these calibrated values.

Prior to, contemporaneous with, or immediately after beginning the sequence of operations necessary to close (or open) the compartment closure assembly 14, e.g., responsive to input command signal Si, the vehicle controller 26 is programmed to prompt FOD system 32 to begin surveying the preventive and protected zones Z1, Z2. Commencement of FOD may be represented by time T0 on the graph of IR light count vs. time in the inset view of FIG. 2. Block 105 of FIG. 3 may correspondingly include configuring the gesture-sensitive sensor 34 to aggregate the requisite data, while block 107 triggers gesture-sensitive sensor 34, and block 109 includes receiving from gesture-sensitive sensor 34 one or more signals indicative of the location and velocity of a detected object 11 moving within the supervision field. As indicated above, the gesture-sensitive sensor 34 includes at least first and second IR emitters 36A, 36B that cooperatively generate the supervision field monitored during FOD procedures. According to the representative vehicle 10 illustrated in FIG. 1 and the representative FOD system 32 illustrated in FIG. 2, this supervision field is inclusive of, but not exclusive to, the first and second zones Z1 and Z2. Protected zone Z2 may be defined by a second volume V2 (FIG. 1) that is delineated by a projected area extending orthogonally from a rear-most plane of the compartment opening 17 and an interior surface of closure assembly 14. In this regard, the preventive zone Z1 may be defined by a first volume V1 (FIG. 1) that is delineated by a projected area extending along an outer perimeter of the compartment opening 17.

In order to generate the signals that may be needed for operation of the FOD system 32, e.g., during preventative protection, process block 105 may include setting up batch multi-channel measurements through a subroutine that configures the gesture-sensitive sensor 34 to aggregate measurements from the IR sensitive cells $C_1, C_2, C_3, \ldots C_N$ into one or more data vectors. As indicated above, the gesture-sensitive sensor 34 includes a matrix of light-receiving cells, each of which has the ability to measure infrared light with an accuracy, e.g., of 24 bits. Rather than perform a step-by-step transfer of data, which may require a relatively long period of time, the sensor 34 can be configured to load cell data into a "vector", properly "pack" all of the cell data into an easily retrievable format, and transfer everything in the data vector in a single "slide transfer." A series of data vectors are transferred from the non-contact sensor 34 to the vehicle controller 26, e.g., in real-time, over the duration of FOD.

Once properly configured, the vehicle controller 26 executes process block 107 and triggers the first LED IR emitter 36A to beam the preventive zone Z1, e.g., at time T0 in the inset graph of FIG. 2. The method 100 continues to block 109 and the controller 26 reads the response of IR transceiver 38. In effect, block 109 may comprise receiving one or more signals output by the gesture-sensitive sensor 34. The signal(s) may include a measurement batch with ambient measurements of ambient light conditions within the supervision field, and an actual measurement of light reflected off a detected object 11 within the supervision field. From these signals, the vehicle controller 26 can determine, among other things, the location and velocity of the object 11, for example, using triangulation digital signal processing, at process block 111. An illustration of optical triangulation processing may comprise one or both LED IR emitters 36A, 36B emitting a pulsed light beam that is collimated along its optical axis and directed toward a target object. With the object at a first position from a first LED IR emitter 36A, a portion of the pulsed light beam is reflected back to a photo-receiving section of the sensor 38 with a position sensitive detector (PSD). The reflected light beam strikes the surface of the IR transceiver 38 at a second position; transceiver 38 converts the light energy striking its surface into two electrical current signals indicative of the position where the reflected light beam impinges upon the PSD surface. When the object moves the position of the reflected light beam also moves, and the difference between the current signals changes. By electronically processing the change of the current signals, a controller can generate distance-measurement related signals. Through this technique, the controller 26 can identify the object's location (e.g., position coordinates within the supervision field) and the object's velocity (e.g., a magnitude of speed and a direction of motion).

The method 100 of FIG. 3 continues to decision block 113 to determine if a valid obstruction has been identified. In other words, not all objects detected within the supervision field are designated as a valid obstruction requiring corrective actions; as such, the system 32 is operable to demarcate between valid and invalid obstructions. By way of non-limiting example, a "valid obstruction" may be flagged when the vehicle controller 26 determines, from the gesture-sensitive sensor signals, that: (1) at time T1 in the graph of FIG. 2, a location of object 11A is within the preventive zone Z1 and the object's velocity (indicated by arrow A1 in FIG. 2) is pointed at the protected zone Z2 and sufficiently fast that the object 11 is likely to obstruct the liftgate 14 before it can close; or (2) at time T2, the object 11B is wholly or partially located inside the protected zone Z2 and the object's velocity (indicated by arrow A2 in FIG. 2) does not suggest that the object 11B will exit the protected zone Z2 so that the liftgate 14 can close on an unobstructed path. As a third option, a "valid obstruction" may be identified by calculating, for an object located inside or outside of the protected zone, a risk factor of that object obstructing the path and contacting the closure assembly while the closure assembly is moving. If it is determined that the calculated risk factor exceeds a calibrated risk tolerance, block 113 may return a true-positive obstruction signal.

If a valid obstruction has been identified (Block 113=Y), the vehicle controller 26 may execute a Preventative Protection remediation protocol at block 115. By way of example, the controller 26 may command the automated driving mechanism 24 to: first, slow the speed of the closure assembly 14 while the assembly 14 is moving along the closing path; if the object is still located inside the protected zone after a calibrated period of time (e.g., at time T3 in FIG. 2), automatically stop the closure assembly 14; and, if the object either leaves the protected zone Z2 or never enters the protected zone Z2 after a calibrated period of time, increase the speed of the closure assembly 26 back to a default closing speed. Using this gesture sensing and interpretation technique will allow the system 32 to remedy a potential obstruction before it becomes an issue. In an example, the liftgate can be slowed in an attempt to alert an unaware user that an obstruction is present so that the user may remove the object and allow the closing procedure to finish unhindered. For instance, unlike many conventional "anti-pinch" systems, the vehicle controller 26 and automated driving mechanism 24 are operable to cooperatively slow the speed of the closure assembly 14 prior to the object 11 entering the protected zone Z2. In the same vein, the vehicle controller 26 and automated driving mechanism 24 are operable to cooperatively stop and/or reverse the closure assembly 14 prior to the object 11 ever entering the protected zone Z2. For at least some system architectures, a reaction time between receiving the gesture-sensitive sensor signals and the slowing of the speed of the closure assembly is less than approximately 235 milliseconds or, in some embodiments, less than approximately 185 milliseconds or, in some embodiments, between approximately 150 and 185 milliseconds. For at least some system architectures, a complete reversal time between receiving the gesture-sensitive sensor signals and reversing the direction of the closure assembly is less than approximately 350 milliseconds or, in some embodiment, between approximately 250 and 300 milliseconds.

When a valid obstruction has not yet been identified (Block 113=N), the method 100 proceeds to initialize a default Secondary Object Detection (SOD) protocol. For instance, if the vehicle controller 26 determines that an object 11 is located inside the protected zone Z2, e.g., before expiration of a calibrated period of time, the controller 26 executes the operations in process block 117 and sets up bi-channel measurements through a subroutine that configures the gesture-sensitive sensor 34 to aggregate measurements from a select subset of IR sensitive cells $C_1$, $C_2$, $C_3$, . . . $C_N$, including reflected light, noise, and ambient light cancellation measurements. Once properly configured, the vehicle controller 26 executes process block 119 and triggers the second LED IR emitter 36B to beam the protected zone Z2. The method 100 continues to block 121 and the vehicle controller 26 reads the response of IR transceiver 38.

With continuing reference to FIG. 3, the method proceeds to process block 123 and executes a digital signal processing (DSP) subroutine. As a non-limiting example, if the vehicle controller 26 wishes to sample a sinusoidal signal in a meaningful manner, the controller 26 may be programmed to read only a minimal number of points to be able to "follow" the signal shape. Rather than implement an ADC converter or similar dedicated device that will increase system costs and potentially undermine reliability, the system 32 can employ an existing microcontroller unit (MCU), which helps to controls the sensor 34, to track the maximum amplitude of the signal rather than the entire shape. Recognizing that the system 32 may already "know" the shape and frequency of the signal, a single measurement may be performed at a designated time when the signal comes to a max or a min value. The method 100 of FIG. 3 then continues to decision block 125 to determine, once again, if a valid obstruction has been identified. If a valid obstruction has been identified (Block 125=Y), the vehicle controller 26 may execute the remediation protocol of block 115. If a valid obstruction has not been identified (Block 125=N), the vehicle controller 26 will determine at decision block 127 if the gate has closed. The method 100 may continue in a continuous loop between blocks 125 and 127 until the gate closes or a valid obstruction is detected and remediation procedures are taken.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed:

1. A method for controlling operation of an automated closure assembly, the automated closure assembly being movable via an automated driving mechanism along a path between closed and open positions to respectively cover and uncover an opening to a compartment of a motor vehicle, the method comprising:
   determining whether the automated closure assembly is in the closed or open position;
   receiving, via a vehicle controller, an input command signal to move the automated closure assembly along the path to the other of the closed or open position;
   receiving, via the vehicle controller from a gesture-sensitive sensor, signals indicative of a location and a velocity of an object moving within a supervision field; and
   responsive to a determination that the object location is inside a protected zone within the supervision field or the object velocity is towards the protected zone, commanding the automated driving mechanism to:
      slow a speed of the automated closure assembly while moving along the path;
      responsive to a determination that the object location is inside the protected zone after a calibrated period of time, stop the automated closure assembly; and
      responsive to a determination that the object location is no longer inside the protected zone, increase the speed of the automated closure assembly to a default speed,
   wherein the protected zone includes a first volume defined by a projected area between the compartment opening and the closure assembly, and
   wherein the supervision field includes the first volume and a second volume, the second volume including a projected area along an outer perimeter of the compartment opening.

2. The method of claim 1, wherein the signals output by the gesture-sensitive sensor include a measurement batch with an ambient measurement of ambient light conditions within the supervision field and an actual measurement of light reflected off the object.

3. The method of claim 1, wherein the gesture-sensitive sensor includes first and second infrared (IR) emitters, the first and second IR emitters cooperatively generating the supervision field and the second IR emitter generating the protected zone.

4. The method of claim 1, wherein a reaction time between receiving of the gesture-sensitive sensor signals and the slowing of the speed of the automated closure assembly is approximately 235 milliseconds or less.

5. The method of claim 1, wherein the gesture-sensitive sensor includes an infrared (IR) transceiver with a matrix of receiver cells, the method further comprising setting up batch multi-channel measurements including configuring the gesture-sensitive sensor to aggregate measurements from all of the receiver cells into a data vector.

6. The method of claim 1, further comprising, responsive to a determination that the object location is inside the protected zone before expiration of a calibrated period of time, setting up a bi-channel measurement including configuring the gesture-sensitive sensor to aggregate measurements for noise and ambient light cancellation.

7. The method of claim 1, wherein the automated driving mechanism slows the speed of the automated closure assembly prior to the object location being inside the protected zone.

8. The method of claim 1, wherein the automated driving mechanism stops the automated closure assembly prior to the object location being inside the protected zone.

9. The method of claim 1, further comprising executing a loop control subroutine operable to synchronize a timing sequence of all operations in the method.

10. The method of claim 1, wherein receiving the signals indicative of the object location and velocity is responsive to: a determination that the automated closure assembly is in the open position and receiving an input command to move the automated closure assembly to the closed position.

11. The method of claim 1, wherein the automated closure assembly is a power liftgate, a power tailgate, a power vehicle door, a power window, a power sunroof, or a power collapsible roof.

12. A method for controlling operation of an automated closure assembly, the automated closure assembly being movable via an automated driving mechanism along a path between closed and open positions to respectively cover and uncover an opening to a compartment of a motor vehicle, the method comprising:
determining whether the automated closure assembly is in the closed or open position;
receiving, via a vehicle controller, an input command signal to move the automated closure assembly along the path to the other of the closed or open position;
receiving, via the vehicle controller from a gesture-sensitive sensor, signals indicative of a location and a velocity of an object moving within a supervision field;
determining, via the vehicle controller, the location and the velocity of the object from the gesture-sensitive sensor signals via triangulation digital signal processing, the location including position coordinates within the supervision field and the velocity including a speed magnitude and a direction of motion; and
responsive to a determination that the object location is inside a protected zone within the supervision field or the object velocity is towards the protected zone, commanding the automated driving mechanism to:
slow a speed of the automated closure assembly while moving along the path;
responsive to a determination that the object location is inside the protected zone after a calibrated period of time, stop the automated closure assembly; and
responsive to a determination that the object location is no longer inside the protected zone, increase the speed of the automated closure assembly to a default speed.

13. The method of claim 12, wherein the signals output by the gesture-sensitive sensor include a measurement batch with an ambient measurement of ambient light conditions within the supervision field and an actual measurement of light reflected off the object.

14. The method of claim 12, wherein the gesture-sensitive sensor includes first and second infrared (IR) emitters, the first and second IR emitters cooperatively generating the supervision field, and the second IR emitter generating the protected zone.

15. The method of claim 12, wherein the gesture-sensitive sensor includes an infrared (IR) transceiver with a matrix of receiver cells, the method further comprising setting up batch multi-channel measurements including configuring the gesture-sensitive sensor to aggregate measurements from all of the receiver cells into a data vector.

16. The method of claim 12, further comprising executing a loop control subroutine operable to synchronize a timing sequence of all operations in the method.

17. A method for controlling operation of an automated closure assembly, the automated closure assembly being movable via an automated driving mechanism along a path between closed and open positions to respectively cover and uncover an opening to a compartment of a motor vehicle, the method comprising:
determining whether the automated closure assembly is in the closed or open position;
receiving, via a vehicle controller, an input command signal to move the automated closure assembly along the path to the other of the closed or open position;
receiving, via the vehicle controller from a gesture-sensitive sensor, signals indicative of a location and a velocity of an object moving within a supervision field;
calculating, via the vehicle controller based on the gesture-sensitive sensor signals and in response to the object location being outside a protected zone and the velocity being towards the protected zone, a risk factor of the object obstructing the path and contacting the closure assembly while the closure assembly is moving;
responsive to a determination that the calculated risk factor exceeds a calibrated risk tolerance, commanding the automated driving mechanism to stop the automated closure assembly; and
responsive to a determination that the object location is inside a protected zone within the supervision field or the object velocity is towards a protected zone commanding the automated driving mechanism to:
slow a speed of the automated closure assembly while moving along the path;
responsive to a determination that the object location is inside the protected zone after a calibrated period of time, stop the automated closure assembly; and
responsive to a determination that the object location is no longer inside the protected zone, increase the speed of the automated closure assembly to a default speed.

18. The method of claim 17, wherein the gesture-sensitive sensor includes first and second infrared (IR) emitters, the first and second IR emitters cooperatively generating the supervision field, and the second IR emitter generating the protected zone.

19. The method of claim 17, wherein the gesture-sensitive sensor includes an infrared (IR) transceiver with a matrix of receiver cells, the method further comprising setting up batch multi-channel measurements including configuring the gesture-sensitive sensor to aggregate measurements from all of the receiver cells into a data vector.

20. The method of claim 17, further comprising executing a loop control subroutine operable to synchronize a timing sequence of all operations in the method.

* * * * *